United States Patent
Lammers et al.

(10) Patent No.: US 10,150,367 B2
(45) Date of Patent: Dec. 11, 2018

(54) PTO SPEED CONTROL SYSTEM FOR WORK VEHICLE

(71) Applicant: Deere & Company, Moline, IL (US)

(72) Inventors: Eric T. Lammers, Cedar Falls, IA (US); Joel R. Brummer, Waterloo, IA (US)

(73) Assignee: Deere & Company, Moline, IL (US)

(*) Notice: Subject to any disclaimer, the term of this patent is extended or adjusted under 35 U.S.C. 154(b) by 145 days.

(21) Appl. No.: 15/248,543

(22) Filed: Aug. 26, 2016

(65) Prior Publication Data

US 2018/0056781 A1 Mar. 1, 2018

(51) Int. Cl.
| B60K 17/28 | (2006.01) |
|---|---|
| B60K 23/00 | (2006.01) |
| B60K 25/06 | (2006.01) |
| F16H 63/46 | (2006.01) |

(52) U.S. Cl.
CPC ............. B60K 17/28 (2013.01); B60K 23/00 (2013.01); B60K 25/06 (2013.01)

(58) Field of Classification Search
CPC ........ B60K 17/28; B60K 25/06; B60K 23/00; F16H 63/46
USPC ............ 701/22, 31, 55, 53; 180/65.1, 65.28; 477/97, 107
See application file for complete search history.

(56) References Cited

U.S. PATENT DOCUMENTS

| 2,958,225 A | 11/1960 | Wagner |
|---|---|---|
| 4,388,843 A | 6/1983 | Teeter |
| 4,722,234 A | 2/1988 | Greene et al. |
| 4,920,813 A | 5/1990 | Willford |
| 5,230,411 A | 7/1993 | Nishida et al. |
| 5,528,949 A | 6/1996 | Stainton et al. |
| 5,846,153 A | 12/1998 | Matsuoka |
| 6,129,187 A | 10/2000 | Bellanger et al. |
| 6,202,812 B1 | 3/2001 | Semke |
| 6,428,447 B2 | 8/2002 | Onuki |
| 8,534,396 B2 | 9/2013 | Schulz et al. |
| 8,783,124 B2 | 7/2014 | Rang et al. |
| 8,996,214 B2 | 3/2015 | Ishii |
| 2010/0099533 A1 | 4/2010 | Horsfall et al. |
| 2013/0283939 A1 | 10/2013 | Eknonen et al. |

(Continued)

FOREIGN PATENT DOCUMENTS

| CN | 103148210 | 4/2015 |
|---|---|---|
| EP | 2675678 | 4/2016 |

*Primary Examiner* — Nga X Nguyen
(74) *Attorney, Agent, or Firm* — Klintworth & Rozenblat IP LLP (57) ABSTRACT

A power take-off (PTO) arrangement is provided for transferring power between a work vehicle and an implement. The PTO arrangement includes a PTO shaft having a PTO flange; and a PTO transmission unit having an input shaft coupled to the work vehicle, an output shaft coupled to the PTO shaft, and a gear set coupling the input shaft to the output shaft such that the power is transferred at a speed ratio selected from at least two speed ratios. A PTO speed control system has a sensor arrangement proximate to the PTO shaft and configured to sense data associated with the PTO flange and generate a PTO flange output signal based on the PTO flange data and a control unit and configured to selectively enable and disable operation of the PTO arrangement based on the PTO flange output signal and the selected speed ratio.

18 Claims, 7 Drawing Sheets

(56) References Cited

U.S. PATENT DOCUMENTS

2014/0235403 A1\* 8/2014 Gilbert .............. B60W 30/1888
477/36
2017/0198809 A1\* 7/2017 Omran ................... B60K 25/06

\* cited by examiner

PTO SPEED CONTROL SYSTEM FOR WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to power take-off arrangements for work vehicles.

BACKGROUND OF THE DISCLOSURE

Work vehicles (and other vehicles) may include onboard power sources to provide motive and other power during vehicle operation. For example, work vehicles such as tractors may include internal combustion engines that convert chemical energy to mechanical energy in order to facilitate execution of useful tasks. Certain vehicles, in addition to primary functionality (e.g., driving and hauling functionality), may be capable of secondary functionality, including through the use of attachable implements. For example, tractors may be outfitted with various implements (e.g., loaders, seeders, and so on) that may be attached to the vehicles in various ways (e.g., through front-end mounts, three-point hitches, and so on). Such implements may be configured to draw power from the associated vehicle via a power take-off arrangement in order to do useful work.

SUMMARY OF THE DISCLOSURE

The disclosure provides power take-off arrangements for work vehicles.

In one aspect, the disclosure provides a power take-off (PTO) arrangement for transferring power between a work vehicle and an implement. The PTO arrangement includes a PTO shaft configured to be coupled to the implement and having a PTO flange; and a PTO transmission unit having an input shaft coupled to the work vehicle, an output shaft coupled to the PTO shaft, and a gear set coupling the input shaft to the output shaft such that the power is transferred at a speed ratio selected from at least two speed ratios. The PTO arrangement includes a PTO speed control system with a sensor arrangement coupled to the transmission unit proximate to the PTO shaft and configured to sense data associated with the PTO flange and generate a PTO flange output signal based on the PTO flange data and a control unit coupled to the sensor arrangement and configured to selectively enable and disable operation of the PTO arrangement based on the PTO flange output signal and the selected speed ratio.

In another aspect, the disclosure provides a power take-off (PTO) speed control system for a power take-off (PTO) arrangement that transfers power between an input shaft and an output shaft at a speed ratio selected from at least two speed ratios. The PTO speed control system includes a PTO shaft configured to be coupled to the output shaft and having a PTO flange with a diameter; a sensor arrangement positioned proximate to the PTO shaft and configured to evaluate the PTO flange and to generate a PTO flange output signal based on the PTO flange evaluation; and a control unit coupled to the sensor arrangement and configured to selectively disable operation of the PTO shaft based on the PTO flange output signal and the selected speed ratio.

In yet another aspect, the disclosure provides a work vehicle that includes a power system; a propulsion system driven by the power system to move the work vehicle; and a power take-off (PTO) arrangement driven by the power system and configured to provide power to an implement attached to the work vehicle at a speed ratio selected from at least two speed ratios. The PTO arrangement includes a housing; an input shaft at least partially extending into the housing and configured to be driven by the work vehicle; an output shaft at least partially extending into the housing; and a PTO shaft coupled to the output shaft and configured to be rotationally coupled to the implement, the PTO shaft including a PTO flange. The work vehicle includes a PTO speed control system with a sensor arrangement mounted on the housing proximate to the PTO shaft and configured to sense data associated with the PTO flange and generate a PTO flange output signal based on the PTO flange data; and a control unit coupled to the sensor arrangement and configured to selectively disable operation of the PTO arrangement based on the PTO flange output signal and the selected speed ratio.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed power take-off (PTO) arrangement, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Furthermore, in detailing the disclosure, terms of direction and orientation, such as "forward," "aft," "lateral," "horizontal," and "vertical" may be used. Such terms are defined, at least in part, with respect to the direction in which the work vehicle travels during use. Further, the discussion below may reference a cylindrical coordinate system with "axial," "radial," and "circumferential" orientations relative to a longitudinal axis.

For various reasons, it may be desirable for a work vehicle to provide power to an associated implement, such as an implement towed or pushed by the work vehicle. Generally, a PTO arrangement is provided to transfer power from an input shaft coupled to the power system of the work vehicle to an output shaft that, in turn, transfers power to the implement. Various types of implements may be utilized, and different types of implements may have different input requirements. As such, the PTO arrangement may include a transmission unit that transfers power at a speed ratio selected by the operator that is appropriate for the respective implement. It is undesirable for the PTO arrangement to provide power at the incorrect speed for the implement, and it is particularly undesirable to provide relatively high speed torque to an implement that is designed for a relatively low speed torque. To address this issue, among others, the examples described herein provide a PTO arrangement with a speed control system that, among other things, may be used to prevent inputs at inappropriately high speeds from being transferred to an implement.

Figure 1:
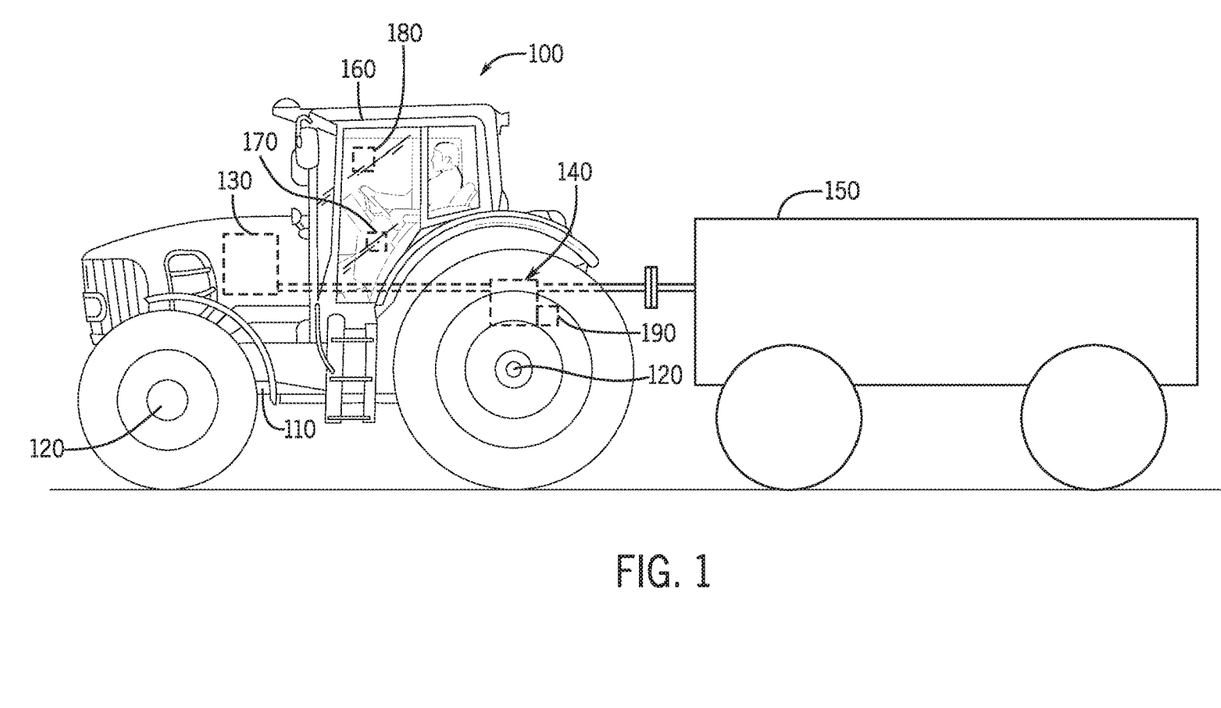
FIG. 1 is a side view of an example work vehicle in the form of an agricultural tractor with a power take-off arrangement that may be used in accordance with this disclosure.

Referring to FIG. 1, the disclosed embodiments may be used in an arrangement in which work vehicle 100, shown as an agricultural tractor, utilizes an accessory component or implement 150. Generally, the examples described herein are applicable to any type of work vehicle 100 and/or implement 150. Examples of work vehicles 100 include tractors, trucks, loaders, and the like. Examples of implements 150 include mowers, seeders, winches, pumps, blowers, booms, and the like.

As shown, the work vehicle 100 may be considered to include a main frame or chassis 110, a propulsion drive assembly 120, a power system 130, a power take-off (PTO) arrangement 140, and an operator platform or cabin 160. In this example, the work vehicle 100 further includes a controller 170 and an operator interface 180.

As is typical, the cabin 160 is mounted to the chassis 110 and houses the operator that controls operation of the work vehicle 100 via the controller 170 and operator interface 180. The power system 130 includes a power source (e.g., an internal combustion engine, a fuel cell, an electric motor, and/or a hybrid-gas electric motor) used for propulsion of the work vehicle 100 via the propulsion drive assembly 120, as well as the auxiliary functions described below.

During operation, the operator may desire to provide auxiliary power for driving the implement 150 to perform a task. As such, the PTO arrangement 140 is provided to transfer power between the power system 130 and the implement 150. In one example, the PTO arrangement 140 includes a housing with a transmission, an input shaft and an output shaft. The input shaft is rotationally coupled to the power system 130 and is further directly or indirectly drivingly connected to the output shaft within the housing by a gear set of the transmission such that the power from the input shaft may be transferred to the output shaft. The implement 150 is drivingly connected to the output shaft via a PTO shaft to receive and utilize this power.

The implement 150 may be designed to operate with particular speed inputs. As such, in one example, the PTO arrangement 140 enables power transfer between the work vehicle 100 and implement 150 according to at least two modes, including modes that correspond to a relatively high speed output mode or a relatively low speed output mode. In the high speed output mode, the PTO arrangement 140 transfers power to the implement 150 at a relatively high speed ratio. In the low speed output mode, the PTO arrangement 140 transfers power to the implement 150 at a relatively low speed ratio. In one example, the high speed may be 1300 RPM and the low speed may be 1000 RPM, although in other examples, the output speed may be different, including an example with a speed of 540 RPM. In further examples, the PTO arrangement may provide additional modes, such as a neutral mode, an efficiency mode, and/or additional speed modes. In some instances, the PTO arrangement 140 may have interchangeable PTO output shafts designed for operation at different speeds. In other words, the PTO shafts of the PTO arrangement 140 may be removable such that the operator may install a PTO shaft suitable for the intended speed of driving the implement 150. Additional details about the PTO arrangement 140 will be provided with reference to FIGS. 2-7.

The controller 170 may be considered a vehicle controller for controlling the vehicle 100 or a portion thereof, including the PTO arrangement 140 and/or implement 150. As such, the controller 170 includes one or more control elements to control various aspects of the operation and is configured to implement the functions described herein. The controller 170 may be configured as a computing device with associated processor devices and memory architectures, as a hard-wired computing circuit (or circuits), as a programmable circuit, as a hydraulic, electrical or electro-hydraulic controller, or otherwise. As such, the controller 170 may be configured to execute various computational and control functionality. In some embodiments, the controller 170 may be configured to receive input signals in various formats (e.g., as hydraulic signals, voltage signals, current signals, and so on), and to output command signals in various formats (e.g., as hydraulic signals, voltage signals, current signals, mechanical movements, and so on). The controller 170 may communicate with other systems or devices (including other controllers) in various known ways, including via a bus, via wireless or hydraulic communication means, or otherwise. An example location for the controller 170 is depicted in FIG. 1. It will be understood, however, that other locations are possible including other locations on the work vehicle 100, or various remote locations.

In some embodiments, controller 170 may be configured to receive input commands and to interface with the operator via the operator interface (or human-machine interface) 180, which may be disposed inside the cabin 160 of the work vehicle 100 for convenient access by the operator. The operator interface 180 may be an input device and an output device and configured in a variety of ways. In some embodiments, the operator interface 180 may include one or more joysticks, various switches or levers, one or more buttons, a touchscreen interface that may be overlaid on a display, a keyboard, a speaker, a microphone associated with a speech recognition system, or various other human-machine interface devices. Among other functions, the operator interface 180 may be used to receive operator commands for activating and controlling the PTO arrangement 140 and implement 150, including selection of a speed output mode described below.

The work vehicle 100 may further include PTO speed control system 190 that generally implements the selected speed for the PTO arrangement. For example, the PTO speed control system 190 may operate a shift device of a transmission unit to result in a selected speed ratio, as described in greater detail below. Further, the PTO speed control system 190 functions to prevent the PTO arrangement 140 from providing power to the implement 150 at inappropriately high speeds, e.g., with an input RPM that is too high for the particular implement 150. As described in greater detail below, the PTO speed control system 190 generally controls the speed of the PTO arrangement 140 and further includes one or more sensor arrangements or units that collect information associated with the PTO shaft of the PTO arrangement 140 selected for the implement 150 in view of the selected speed output mode, and if the selected speed output mode is inappropriate for the speed associated with the PTO shaft, the PTO speed control system 190 may disable operation of the PTO arrangement 140 by sending a disable signal to the controller 170 or directly to the PTO arrangement 140.

As such, during operation of the work vehicle 100 and/or implement 150, the operator selects the appropriate mode for power transfer via the operator interface 180. As introduced above, such modes may include a high speed output mode or a low speed output mode. The operator interface 180 communicates with the controller 170 and/or the PTO speed control system 190 to implement the selection. As examples, the controller 170 and/or the PTO speed control system 190 generates appropriate commands to the power system 130 and one or more components of the PTO arrangement 140, including a clutch device, a brake device, and a shift device, to provide the appropriate output at the implement 150. In some situations, mode selection may be made automatically by the controller 170 and/or the PTO speed control system 190 based on operating conditions. Additionally, the PTO speed control system 190 collects information or data associated with the PTO shaft of the PTO arrangement 140 in view of the selected speed output mode and disables operation of the PTO arrangement 140 when the selected speed output mode is inappropriate for the selected PTO shaft. In one example, upon the PTO speed control system 190 disabling operation, the operator interface 180 may display or otherwise convey a message, warning, or advisory to inform the operator that the selected speed output mode is inappropriate for the PTO shaft. Additional details about the PTO arrangement 140 and the PTO speed control system 190 are provided below.

Figure 2:
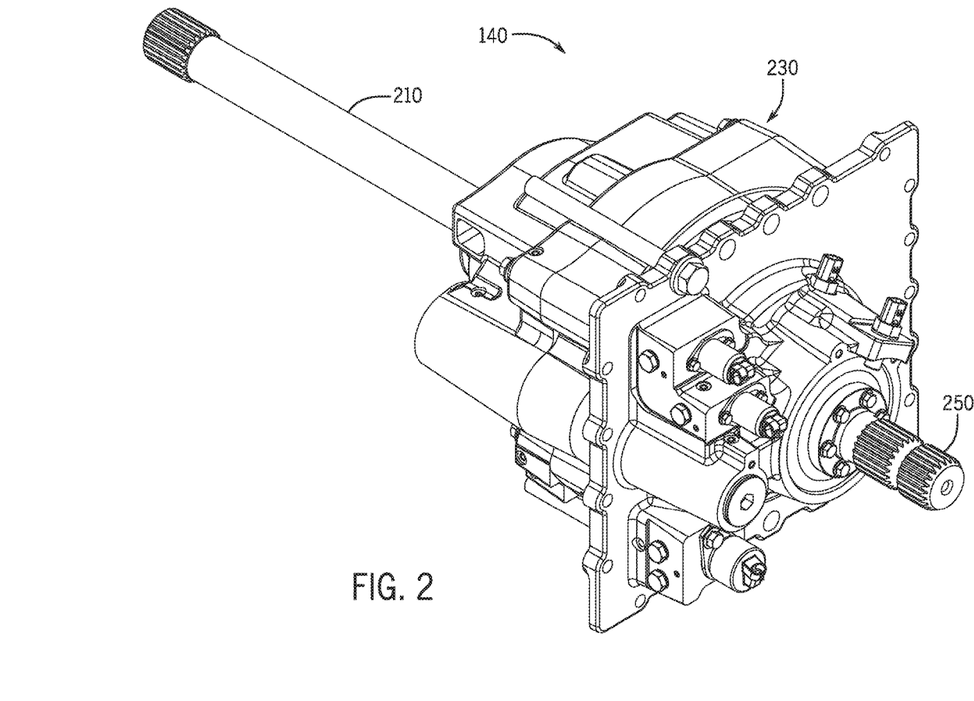
FIG. 2 is a perspective view of the power take-off arrangement shown in FIG. 1 in accordance with an example embodiment.

FIG. 2 is a perspective view of the PTO arrangement 140 shown in FIG. 1 in accordance with an example embodiment. In this example, the PTO arrangement 140 includes an input shaft 210 that may be splined connected to the drive shaft or transmission of the power system 130 and a PTO shaft 250 with spline connection for coupling with the implement 150. A PTO transmission unit 230 functions to selectively couple the input shaft 210 to the PTO shaft 250 for power transfer, as described in greater below.

As noted above, the transmission unit 230 functions to receive power in the form of torque from the input shaft 210 and transfer the power to the PTO shaft 250 at one of least two speeds based on the selected speed output mode. As described in greater detail below, the PTO shaft 250 is removable and replaceable with an alternative PTO shaft. Generally, the PTO shaft 250 may be designed for a particular implement 150, and thus, a particular speed. As such, the PTO shaft 250 may be selected based on the implement 150 such that an implement designed for a relatively low speed may be associated with a first PTO shaft and an implement designed for a relatively high speed may be associated with a second PTO shaft. The PTO shaft(s) 250 may have characteristics that represent the appropriate speed at which the PTO shaft 250 and the implement 150 should be operated. For example, an annular flange on the PTO shaft 250 may be sized to indicate the designated speed.

Figure 3:
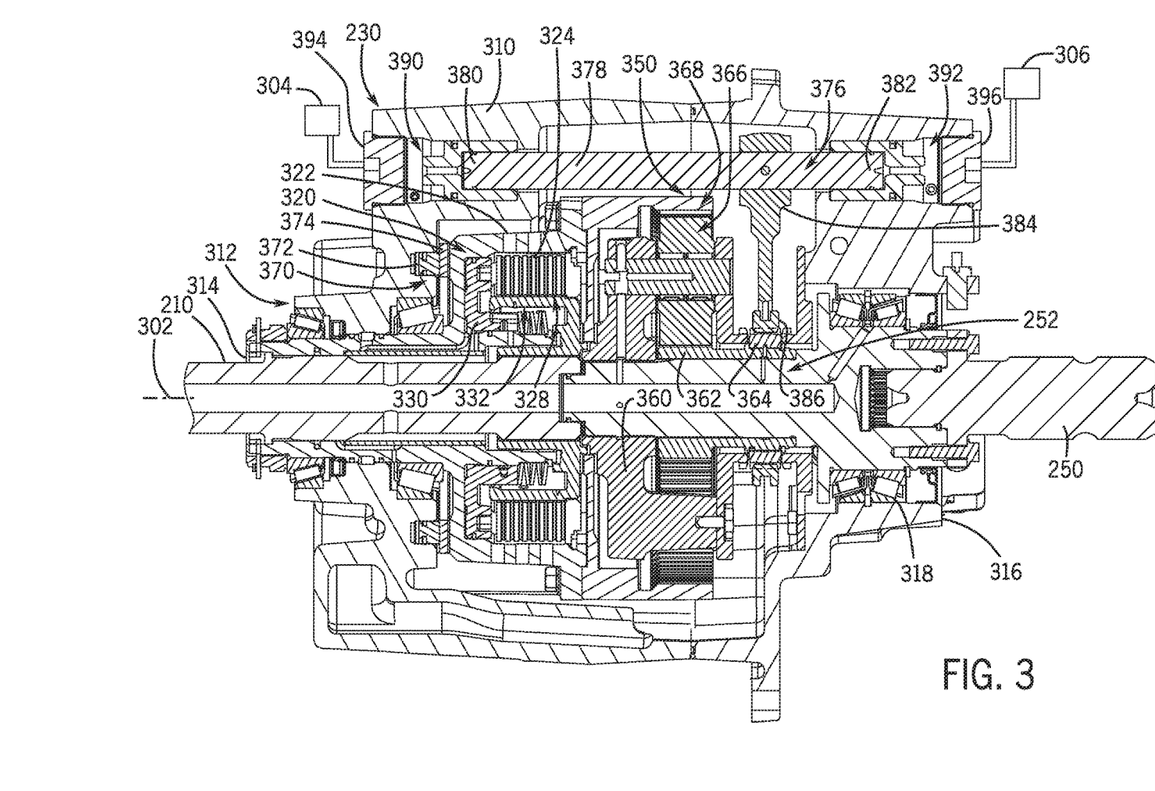
FIG. 3 is a cross-sectional view of a transmission unit of the power take-off arrangement shown in FIG. 1 in accordance with an example embodiment.

FIG. 3 is a cross-sectional view of the transmission unit 230 of the PTO arrangement 140 shown in FIG. 1 in accordance with an example embodiment. The transmission unit 230 generally includes a housing 310 that at least partially encloses and supports the working components. The housing 310 includes a first face or side 312 that defines a bore 314 through which the input shaft 210 extends and a second face or side 316 that defines a bore 318 through which the PTO shaft 250 extends. As described in greater detail below, the input shaft 210 is selectively coupled to or decoupled from the PTO shaft 250 via a clutch device 320, a planetary gear set 350, and an output shaft 252. The shafts 210, 250, 252, as well as other components of the transmission unit 230, may be mounted with bearings that enable rotation relative to housing 310.

The clutch device 320 is arranged within the housing 310 and includes a clutch drum 322 mounted to the planetary gear set 350 and a clutch hub 332 supported by drum 322 and driven by input shaft 210. Friction plates 324 extend from the clutch drum 322 and are interleaved with cooperating friction plates 328 extending from the clutch hub 332. The clutch device 320 further includes an actuation arrangement 330 to place the clutch device 320 in an engaged condition in which the two sets of plates 324, 328 are urged together to rotationally fix the clutch hub 332 and the input shaft 210 to the clutch drum 322 and the planetary gear set 350 or a disengaged condition in which the two sets of plates 324, 328 are urged apart to separate the clutch hub 332 and the input shaft 210 from the clutch drum 322 and the planetary gear set 350. Any suitable actuation arrangement 330 may be provided. As an example, the actuation arrangement 330 may include a spring element that urges the friction plates 324, 328 apart to disengage the clutch drum 322 from the clutch hub 332 and hydraulic piston plate that is actuated by a pressure source (not shown) to urge the friction plates 324, 328 together. As a result of this arrangement, when the clutch device 320 is engaged, torque is transferred from the input shaft 210 to the planetary gear set 350 to drive the output shaft 252, which in turn is rotationally fixed to drive the PTO shaft 250. In this example, the clutch device 320 is integrated into the transmission unit 230. However, in other examples, the clutch device 320 may be moved to another part of the work vehicle 100.

The planetary gear set 350 includes a planet carrier 360, a sun gear 362, a set of planet gears 366, and a ring gear 368. Generally, the set of planet gears 366 includes a number of planet gears (e.g., three, one of which is shown) with teeth that engage corresponding teeth on an outer circumference of the sun gear 362 and corresponding teeth on an inner circumference of the ring gear 368. The planet gears 366 are supported by the planet carrier 360. The planet carrier 360 includes a central opening for mounting, and rotationally fixing, the planet carrier 360 on the output shaft 252. In this example, the planet carrier 360 has an axis 302 generally coincident to the axis of the input shaft 210, the output shaft 252, and the PTO shaft 250. The output shaft 252 also extends through the sun gear 362 and has a first end supporting planet carrier 360 and a second end with splines that rotationally fix the output shaft 252 and planet carrier 360 to the PTO shaft 250. The planet carrier 360 extends radially to each of the planet gears 366. As such, the planet carrier 360 is coupled to the center of each of the planet gears 366 such that the planet gears 366 revolve around the sun gear 362.

As described in greater detail below, the planet carrier 360, the sun gear 362, and housing 310 include features such as toothed collars that enable a shift device 376 to rotationally fix the sun gear 362 and the planet carrier 360, rotationally fix the sun gear 362 and the housing 310, or rotationally de-couple the sun gear 362 from both the planet carrier 360 and the housing 310.

In one example, the ring gear 368 extends about and engages the planet gears 366 for rotation. As previously noted, upon engagement of the clutch device 320, power is transferred from the input shaft 210 to the planetary gear set 350. The planetary gear set 350 further includes a brake device 370 on the ring gear 368 that restricts movement of the ring gear 368 when engaged, typically when the implement 150 (FIG. 1) is not operating, such as when the PTO arrangement 140 is off or operating in a neutral mode. In one example, the brake device 370 includes a pressure or friction plate 374 that is urged against the clutch drum 322 by a hydraulically actuated brake piston 372. As such, the brake device 370 acts upon the clutch drum 322, which in turn is fixed to the ring gear 368, such that the brake device 370 restricts movement of the ring gear 368 when engaged. Although not shown, the brake device 370 may further include a spring or other mechanism for releasing the friction plate 374 when the brake piston 372 is no longer actuated.

A shift device 376 is provided to fix or release various components of the planetary gear set 350 such that the power is transferred at one of two designated speed ratios or such that power is not transferred. Generally, the shift device 376 includes a shift rail 378, a shift fork 384, and a shift collar 386. The ends 380, 382 of the shift rail 378 extend into respective chambers 390, 392 formed in the housing 310. As described in greater detail below, the chambers 390, 392 enable limited axial movement of the shift rail 378 while restricting radial movement. The position of shift device 376 is controlled by pressurizing one or both of the chambers 390, 392. As described below, when chamber 392 is pressurized and chamber 390 is not pressurized (e.g., vented), the shift rail 378 is translated into a first position; when chamber 390 is pressurized and chamber 392 is not pressurized, the shift rail 378 is translated into a second position; and when both chambers 390, 392 are pressurized, the shift rail 378 is translated into a third position. The fluid (e.g., typically oil) for pressurizing the chambers 390, 392 is provided via one or more pressure sources 304, 306 through internal passages in housing 310, based on commands from the operator via the operator interface 180 and the controller 170 (FIG. 1), and end caps 394, 396 partially seal the chambers 390, 392. Any suitable mechanism for pressurizing and venting the chambers 390, 392 may be provided. Additional components facilitating this function may be provided, such as pumps, valves, conduits, and the like.

One end of the shift fork 384 is secured to the shift rail 378 and the other end engages the shift collar 386 such that the shift fork 384 and the shift collar 386 axially translate (or slide) with the shift rail 378. As a result of this arrangement, the shift rail 378 is selectively translated to appropriately position the shift collar 386 into one of the three positions introduced above.

In the first position, the shift collar 386 engages features on the planet carrier 360 and the sun gear 362 to rotationally fix the planet carrier 360 with the sun gear 362. This position corresponds to a high speed output mode in which torque from the input shaft 210 is transferred to the planetary gear set 350. Since the sun gear 362 is rotationally fixed to the planet carrier 360, as a unit, the ring gear 368, the planet gears 366, and the sun gear 362 are locked together for rotation about an effective diameter equal to that of the input shaft 210. As such, the planetary gear set 350 drives the output shaft 252 and PTO shaft 250 at a first speed that is approximately equal to the speed of the input shaft 210.

In the second position, the shift collar 386 engages features on the sun gear 362 and the housing 310 to rotationally fix the sun gear 362 to the housing 310 to effectively restrict rotation of the sun gear 362 (e.g., to "ground" the sun gear 362). This position corresponds to a low speed output mode in which torque from the input shaft 210 is transferred to the planetary gear set 350. Since the sun gear 362 is fixed to the housing 310, the sun gear 362 is stationary, and torque from the input shaft 210 is transferred to the ring gear 368 to drive the planet gears 366 and the planet carrier 360 about the sun gear 362. As such, the ring gear 368 turns at the speed of the input shaft 210 and the planet gears 366 revolve around the fixed sun gear 362, and because of different gear ratios, the carrier 360 rotates at a different, reduced speed than the ring gear 368. At this reduced ratio, the planetary gear set 350 drives the output shaft 252 and the PTO shaft 250 at a second speed that is less than the first speed (and less than the speed of the input shaft 210).

In the third position, the shift collar 386 is "neutral" and is positioned on a shift hub 364 mounted about the sun gear 362 and does not rotationally fix the sun gear 362 to the housing 310 or the planet carrier 360. This position corresponds to a neutral mode in which the sun gear 362 and the planet carrier 360 are free to rotate relative to one another. Typically, in this mode, the clutch device 320 is disengaged such that power is not transferred between the input shaft 210 and the planetary gear set 350. Since the sun gear 362 and the planet carrier 360 are free to rotate, the output shaft 252 and PTO shaft 250 are also free to rotate without resistance from the brake device 370 engaging the ring gear 368. This enables manipulation of the output shaft 252 and PTO shaft 250 without resistance from the brake device 370 or the input shaft 210. In some examples, the neutral mode may be omitted. Although a planetary gear set 350 is depicted, other gear arrangements may be provided, such as a parallel-axis gear set that uses one countershaft and two gear pairs to achieve similar gear ratios. Similarly, other configurations of the input shaft 210, the clutch device 320, the planetary gear set 350, the output shaft 252, the PTO shaft 250, and the shift device 376 may be provided. Although one example PTO arrangement 140 has been described, the PTO speed control system 190 described below may be used with any type of PTO arrangement 140 in which two or more speeds are provided to drive the PTO shaft 250.

Figure 4:
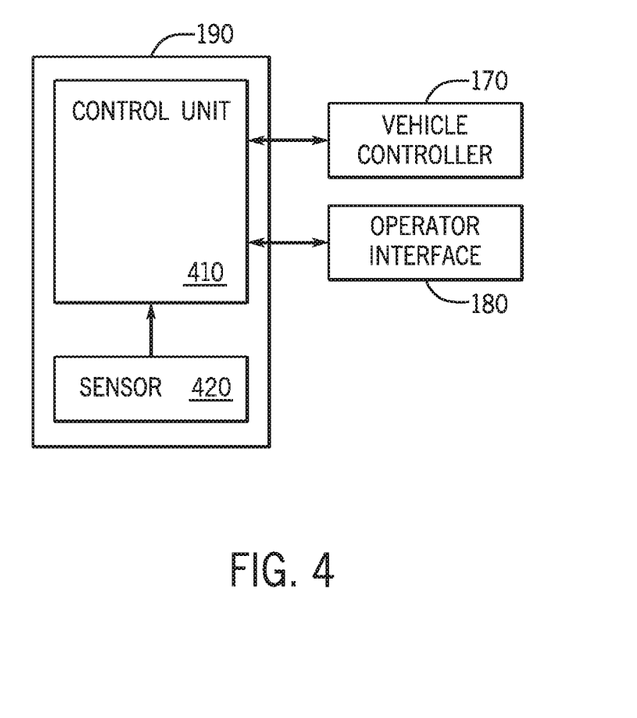
FIG. 4 is a schematic block diagram of a PTO speed control system associated with the power take-off arrangement shown in FIG. 1 in accordance with an example embodiment.

FIG. 4 is a schematic block diagram of the PTO speed control system 190 associated with the power take-off arrangement 140 shown in FIG. 1 in accordance with an example embodiment. In one example, the PTO speed control system 190 includes a control unit 410 and one or more sensor arrangements 420. As described below, the control unit 410 of the PTO speed control system 190 may interact with the vehicle controller 170 and operator interface 180, as referenced above in the description of FIG. 1.

The control unit 410 generally controls operation of the PTO speed control system 190 and may be configured as a computing device with associated processor devices and memory architectures, as a hard-wired computing circuit (or circuits), as a programmable circuit, or otherwise. As such, the control unit 410 may be configured to execute various computational and control functionality. In some embodiments, the control unit 410 may be configured to receive input signals and output command signals in various formats. The control unit 410 may communicate with other systems or devices in various known ways, including via a bus, via wireless or hydraulic communication means, or otherwise. The control unit 410 may be located in any suitable position on or in the work vehicle 100. In some examples, the control unit 410 may be integrated with the vehicle controller 170, such as a sub-module executed by the vehicle controller 170.

As described in greater detail below, the sensor arrangement 420 includes one or more sensor elements positioned on or in the transmission unit 230 (FIG. 3) to collect information associated with or otherwise evaluate the PTO shaft 250. In one example, the sensor arrangement 420 collects information associated with a flange of the PTO shaft 250 that is sized to indicate the appropriate speed at which the associated implement 150 should be operated (e.g., the "designated speed" of the PTO shaft 250 and/or implement 150). In particular, the sensor arrangement 420 collects information associated with the PTO flange and generates PTO flange output signals that are provided to the control unit 410. Since the PTO flange may represent the designated speed of the PTO shaft 250, the PTO flange output signals may also represent the designated speed of the PTO shaft 250. Additional descriptions of the position and operation of the sensor arrangement 420 are provided below.

Accordingly, during operation, the control unit 410 receives a speed output mode selection from the operator interface 180 and/or vehicle controller 170 that indicates the current or selected speed output mode of the PTO arrangement 140, thereby indicating the speed ratio at which the PTO arrangement 140 will drive the PTO shaft 250. The control unit 410 additionally receives PTO flange output signals from the sensor arrangement 420 that represents the designated speed at which the PTO shaft 250 should be operated. If the selected speed output mode is inappropriate for the current PTO shaft 250, then the control unit 410 will output a command signal to the controller 170 that disables operation of the PTO arrangement 140. The control unit 410 determines that the selected speed output mode is inappropriate with respect to the designated speed when the selected speed output mode is too fast for the designated speed. In some examples, the control unit 410 determines that the selected speed output mode is inappropriate with respect to the designated speed when the selected speed output mode is mismatched with the designated speed (e.g., too fast or too slow). Additionally, or alternatively, the control unit 410 will output a command signal to the operator interface 180 that informs the operator of the issue. In one example, the control unit 410 may provide a warning or advisory to the operator via the operator interface 180. If the selected speed output mode is appropriate for the current PTO shaft 250, then the control unit 410 will enable or otherwise allow operation of the PTO arrangement 140.

Any suitable type of sensor arrangement 420 may be provided. In one example, the sensor arrangement 420 includes one or more Hall effect sensor elements that operate to detect the presence of a flange (e.g., the flange of the PTO shaft 250) within a predetermined distance from the sensor arrangement 420. In effect and described in greater detail below with examples, the sensor arrangement 420 may be positioned to detect a relatively large diameter flange and not detect a relatively small diameter flange. In this manner, the sensor arrangement 420 may function as a switch to distinguish between two different sizes of flanges, and thus, two different types of the PTO shafts 250.

In further examples, other types of sensor elements may be incorporated into the sensor arrangement 420 to distinguish between at least two different types of PTO shafts 250. For example, the sensor arrangement 420 may include at least one proximity sensor element that emits a field or beam of electromagnetic radiation and that detects changes in the field or return signals such that flanges of different sizes may be distinguished. In this manner, the sensor arrangement 420 may evaluate the PTO shaft 250 based on the size of the associated flange.

Figure 5:
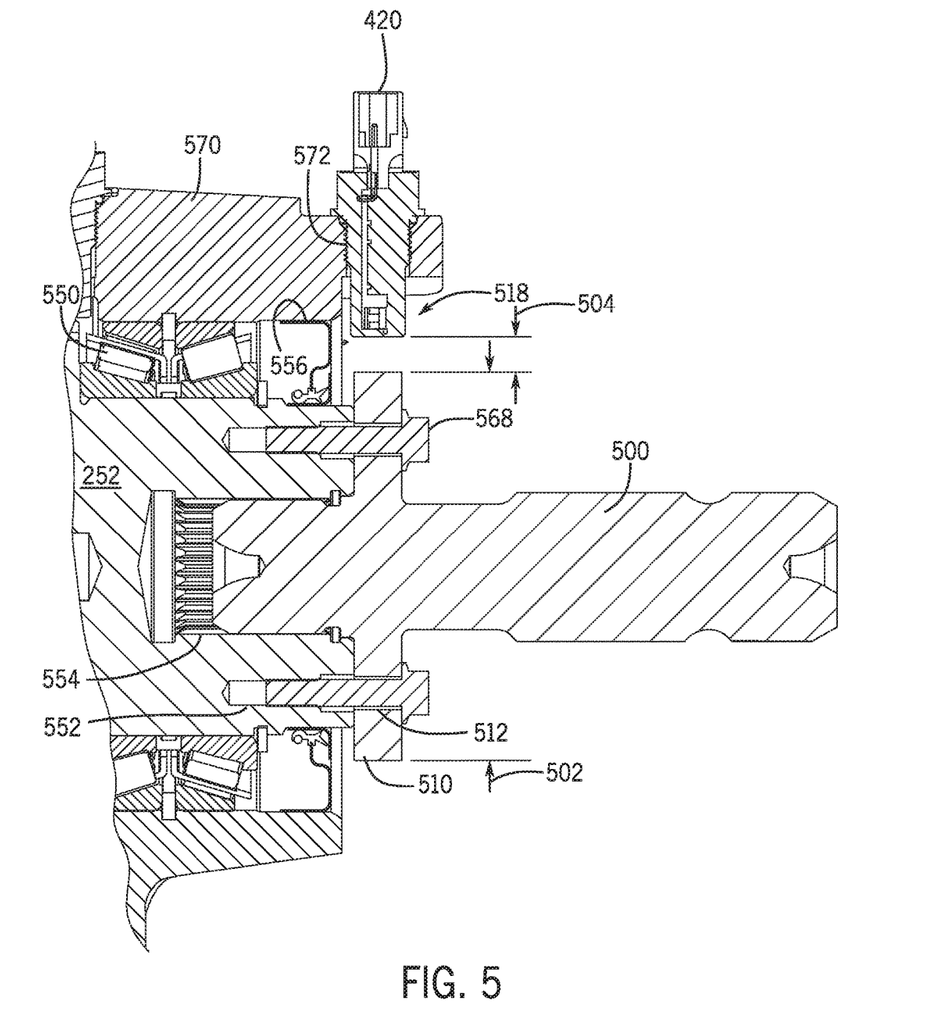
FIG. 5 is a partial, more detailed cross-sectional view of a sensor arrangement of the PTO speed control system shown in FIG. 4 associated with a first power take-off shaft in accordance with an example embodiment.

FIG. 5 is a partial, more detailed cross-sectional view of the sensor arrangement 420 of the PTO speed control system 190 depicted in FIG. 4 associated with the transmission unit 230 of the PTO arrangement 140 depicted in FIG. 3. As previously noted, the PTO arrangement 140 includes a PTO shaft 500 configured to be coupled to an implement (e.g., implement 150 of FIG. 1). The implement is generally designed to be operated at a designated speed, and the PTO shaft 500 is selected corresponding to that speed. In FIG. 5, a PTO shaft 500 associated with a relatively high speed implement has replaced the PTO shaft 250 depicted in FIG. 3. Otherwise noted, the transmission unit 230 partially depicted in FIG. 5 is similar to the transmission unit 230 depicted in FIG. 3.

As shown, the PTO shaft 500 includes a first end received in a mating sleeve or end 554 of the output shaft 252. The mating sleeve 554 of the output shaft 252 is provided with splines that engage corresponding splines on the PTO shaft 500 for the transmission of torque between the output shaft 252 and the PTO shaft 500. The other end of the PTO shaft 500 also includes splines on the external circumferential surface that mate with an input shaft of an implement (not shown).

The PTO shaft 500 further includes a radial PTO flange 510 extending about the circumference of the PTO shaft 500. The PTO flange 510 defines a number of axial mounting holes 512. In one example, the PTO flange 510 has a generally smooth circumferential surface, e.g., uninterrupted by teeth or other projections. The PTO flange 510 may be considered to have an outer diameter 502, which as introduced above, may be sized to indicate the designated speed of the PTO shaft 500. Additional details regarding the PTO flange 510 are provided below.

To mount the PTO shaft 500 to the output shaft 252, the PTO shaft 500 is inserted into the mating sleeve 554 of the output shaft 252. Insertion of the PTO shaft 500 is limited by the PTO flange 510 that engages the end face of the output shaft 252. The PTO shaft 500 is positioned such that the axial mounting holes 512 defined in PTO flange 510 are aligned with corresponding axial mounting holes 552 defined in the end face of the output shaft 252. Fasteners (e.g., screws) 568 extend through the axial mounting holes 512 of the PTO flange 510 and the axial mounting holes 552 of the output shaft 252 to secure the PTO shaft 500.

As shown and introduced above, the housing 310 of the transmission unit 230 defines the bore 318 supporting the output shaft 252. At least a portion of the bore 318 is formed by an axial flange or projection 570 formed in the housing 310. The axial flange 570 of the housing 310 extends around at least a portion of the output shaft 252 and the PTO shaft 500. The output shaft 252 is mounted within the housing 310 with bearings 550. An annular seal 556 is also positioned between the output shaft 252 and the housing 310.

A cavity 518 is defined by the seal 556 an interior surface of the axial flange 570, and portions of at least one or more of the outer circumferential surfaces of the output shaft 252 and the PTO flange 510. In one example, the cavity 518 may be considered "dry" in that the cavity 518 is separated from oil and other fluids within the transmission unit 230 as well as from fluids originating from outside of the transmission unit 230.

Although not shown, an end cap having a ring portion and a radial extension extending from the ring portion may be inserted over the PTO shaft 500 to engage the side of the PTO flange 510 opposite that of the output shaft 252. In such an example, the end cap may define an additional set of axial mounting holes that are aligned with the axial mounting holes 512 of the PTO flange 510 and the axial mounting holes 552 of the output shaft 252 to additionally receive screws 568. In this manner, the cavity 518 may additionally be defined the radial flange of the end cap As introduced above, the sensor arrangement 420 associated with the PTO speed control system 190 (FIG. 4) is mounted on the housing 310 in a position proximate to the PTO flange 510. In one example, the sensor arrangement 420 extends through a mounting hole 572 in the axial flange 570 of the housing 310 and at least partially into the cavity 518. The sensor arrangement 420 is particularly positioned on a side of the cavity 518 opposite to the PTO flange 510 and at a distance from the PTO flange 510. The sensor arrangement 420 may be secured to the housing 310 in any suitable manner.

As shown, the sensor arrangement 420 is particularly positioned to collect information associated with the PTO flange 510. In one embodiment, the sensor arrangement 420 is positioned to evaluate the diameter 502 of the PTO flange 510. In one example, the sensor arrangement 420 is a Hall effect sensor or proximity sensor that detects the presence of a flange within a predetermined detection distance 504 of the sensor arrangement 420. In other words, the sensor arrangement 420 detects a flange (e.g., PTO flange 510) that extends to a position within the predetermined detection distance 504, or stated differently, that the sensor arrangement 420 is spaced apart from the outer extent of the PTO flange 510 at a distance no more than the predetermined detection distance 504. As a result of this arrangement, the flanges of the PTO shafts may be sized such that the sensor arrangement 420 may differentiate between different PTO shafts. In the example show, the flange 510 has a diameter 502 that extends within the cavity 518 to a position within the predetermined detection distance 504 from the sensor arrangement 420 such that the sensor arrangement 420 detects the presence of the PTO flange 510, and thus, the PTO shaft 500. Additional details regarding operation of the sensor arrangement 420 are provided below.

Figure 6:
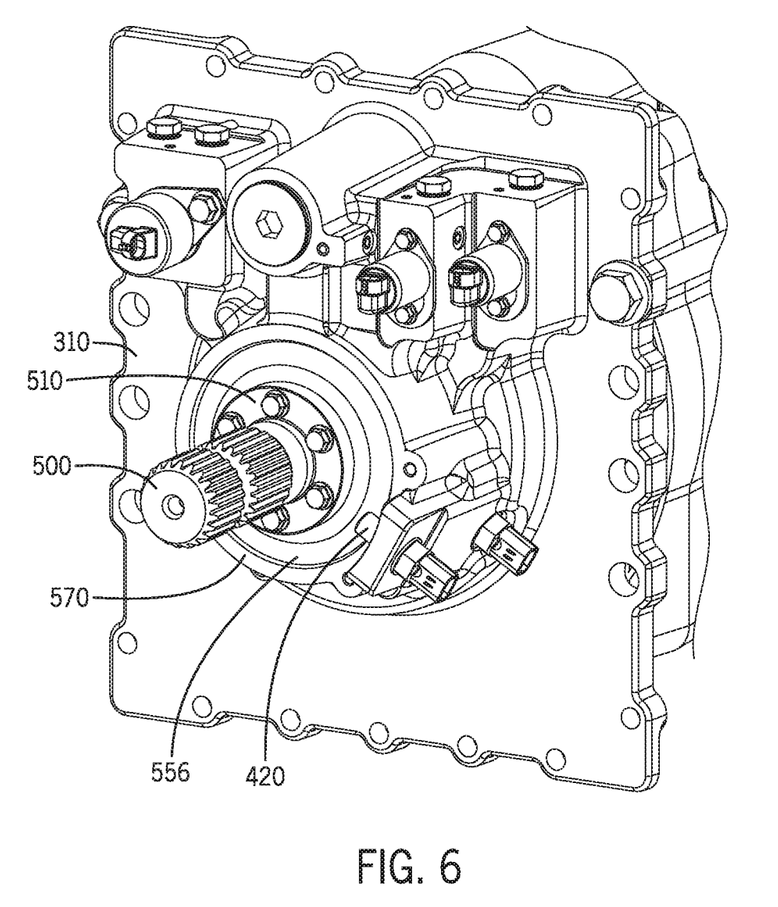
FIG. 6 is a partial, perspective view of the sensor arrangement shown in FIG. 5 in accordance with an example embodiment.

FIG. 6 is a partial, perspective view of the sensor arrangement 420 of FIG. 5 in accordance with an example embodiment. Relative to the view of FIG. 5, the view of FIG. 6 is from a perspective external to the housing 310 of the transmission unit 230.

Figure 7:
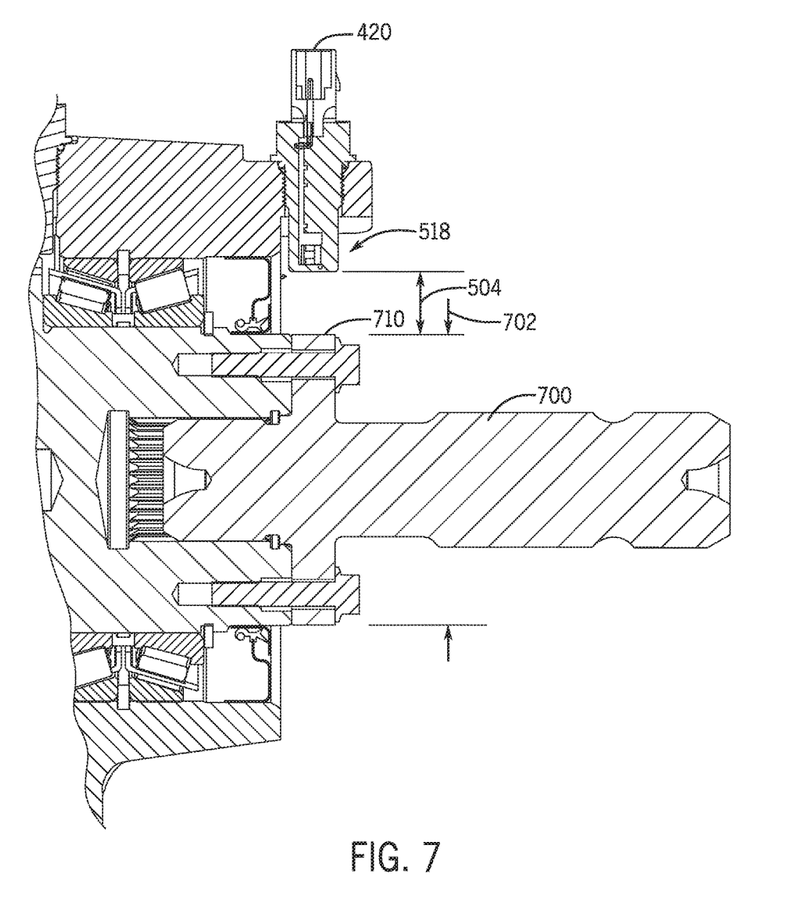
FIG. 7 is a partial, more detailed cross-sectional view of the sensor arrangement of the PTO speed control system shown in FIG. 4 associated with a second power take-off shaft in accordance with an example embodiment.

FIG. 7 is a partial, more detailed cross-sectional view of the sensor arrangement 420 of the PTO speed control system 190 depicted in FIG. 4 associated with a second power take-off shaft 700 in accordance with an example embodiment. The arrangement of FIG. 7 is identical to the arrangement of FIG. 5 with the exception that the PTO shaft 500 in FIG. 5 has been replaced by a different PTO shaft 700 in FIG. 7. In this example, the PTO shaft 700 has a PTO flange 710 with a relatively smaller radial diameter 702 such that the PTO flange 710 does not extend to be within the predetermined detection distance 504 of the sensor arrangement 420. As a result, the sensor arrangement 420 in FIG. 7 does not detect the presence of the PTO flange 710.

As provided by the comparison of FIG. 5 and FIG. 7, the sensor arrangement 420 of the PTO speed control system 190 has the ability to differentiate between two types of PTO shafts, e.g., a PTO shaft 500 with a relatively large PTO flange 510 and a PTO shaft 700 with a relatively small PTO flange 710. As such, the PTO flanges 510, 710 may be designed to represent PTO shafts 500, 700 with different capabilities. For example, the PTO shaft 500 of FIG. 5 may be designed to drive an associated implement with a relatively high speed ratio, and the PTO shaft 700 of FIG. 7 may be designed to drive an associated implement with a relatively low speed ratio. In view of the examples in FIGS. 4-7, one example of operation of the PTO speed control system 190 will now be described.

Upon installation of the PTO shaft 500, 700 onto the output shaft 252, the sensor arrangement 420 collects information associated with, or otherwise evaluates, the diameter 502, 702 of the PTO flange 510, 710. In particular, the sensor arrangement 420 determines if the PTO flange 510, 710 has a diameter 502, 702 sufficient to be within a predetermined detection distance 504 of the sensor arrangement 420.

If the sensor arrangement 420 detects the presence of the PTO flange 510 within the predetermined detection distance 504, such as in FIG. 5, the sensor arrangement 420 generates a first PTO flange detection signal such that the control unit 410 identifies the PTO shaft 500 as a PTO shaft associated with high speed ratios. In response, the control unit 410 enables operation of the PTO arrangement 140. In this example, the control unit 410 enables operation of the PTO arrangement 140 regardless of the selected mode of operation. As such, the PTO arrangement 140 may operate the PTO shaft 500 at a relatively high speed ratio or a relatively low speed ratio.

If the sensor arrangement 420 fails to detect the presence of the PTO flange 710 within the predetermined detection distance 504, such as in FIG. 7, the sensor arrangement 420 generates a second PTO flange detection signal such that the control unit 410 identifies the PTO shaft 700 as a PTO shaft associated with low speed ratios. In response, the control unit 410 further evaluates the selected mode of the PTO arrangement 140. If the PTO arrangement 140 is in a low speed output mode, the control unit 410 enables operation of the PTO arrangement since the PTO shaft 700 is appropriate for the selected mode. However, if the PTO arrangement 140 is in a high speed output mode, the control unit 410 disenables operation of the PTO arrangement or limits operation to the low speed output mode since the PTO shaft 700 is inappropriate for the selected mode. In this manner, the PTO speed control system 190 prevents operation of the PTO arrangement 140 when the selected mode has an output that is too high for the installed PTO shaft 500, 700 and the associated implement.

In the example described above, the control unit 410 enables operation of the PTO arrangement 140 upon detection of a PTO shaft 500 associated with a high speed ratio regardless of the selected mode of operation, thereby potentially resulting in a scenario in which the PTO shaft 500 designed for a relatively high speed ratio is operated in a relatively low speed output mode. However, this scenario does not present safety or operational concerns and therefore should be acceptable. In other examples, the controller 170 may provide a warning to the operator via the operator interface 180 or even disable operation of the PTO shaft 500, 700 when the control unit 410 determines that the installed PTO shaft 500, 700 is different than the PTO shaft 500, 700 associated with the selected mode.

Accordingly, in one the example, a PTO speed control system is provided with a PTO arrangement that prevents operation at inappropriate PTO shaft speeds. This enables operation of a PTO arrangement in one of at least two speed modes while preventing inadvertently overspeeding a low speed PTO shaft and implement. In one example, this arrangement provides overspeed prevention upon installation of the PTO shaft prior to operation or driving of the PTO shaft, thereby further improving operational safety.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A power take-off (PTO) arrangement for transferring power between a work vehicle and an implement, the PTO arrangement comprising:
    a PTO shaft configured to be coupled to the implement and having a PTO flange;
    a PTO transmission unit having an input shaft coupled to the work vehicle, an output shaft coupled to the PTO shaft, and a gear set coupling the input shaft to the output shaft such that the power is transferred at a speed ratio selected from at least two speed ratios; and
    a PTO speed control system comprising:
        a sensor arrangement coupled to the transmission unit proximate to the PTO shaft and configured to sense data associated with the PTO flange and generate a PTO flange output signal based on the PTO flange data;
        a control unit coupled to the sensor arrangement and configured to selectively enable and disable operation of the PTO arrangement based on the PTO flange output signal and the selected speed ratio;
        wherein the sensor arrangement is spaced apart from the PTO flange and has a detection range of a predetermined distance; and
        wherein the sensor arrangement is configured to output a first PTO flange output signal when the PTO flange is spaced from the sensor arrangement less than the predetermined distance and a second PTO flange output signal when the PTO flange is spaced from the sensor arrangement greater than the predetermined distance.

2. The PTO arrangement of claim 1, wherein the PTO flange has a diameter, and wherein the sensor arrangement is configured to collect data associated with the diameter of the PTO flange.

3. The PTO arrangement of claim 2, wherein the diameter of the PTO flange represents a designated speed for operation of the PTO shaft.

4. The PTO arrangement of claim 1, wherein the at least two speed ratios include a first speed ratio and a second speed ratio, the first speed ratio being greater than the second speed ratio; and
    wherein the control unit is configured to disable the PTO arrangement when the selected speed ratio is the first speed ratio and the control unit receives the second PTO flange output signal from the sensor arrangement.

5. The PTO arrangement of claim 1, wherein the sensor arrangement comprises a Hall effect sensor.

6. The PTO arrangement of claim 1, wherein the sensor arrangement comprises a proximity sensor.

7. The PTO arrangement of claim 1, wherein the transmission unit has a housing defining an axial housing flange circumscribing at least a portion of the output shaft and the PTO shaft, the sensor arrangement being mounted on the axial housing flange.

8. The PTO arrangement of claim 7, wherein the PTO flange defines a first set of mounting holes and the output shaft defines a second set of mounting holes, and wherein the PTO arrangement further comprises: fasteners extending through the first and second set of mounting holes for securing the PTO shaft to the output shaft.

9. The PTO arrangement of claim 8, wherein the transmission unit further comprises:
    a seal positioned between the output shaft and the axial housing flange; and
    a cavity formed by the seal, the output shaft and the axial housing flange,
    wherein the sensor arrangement is at least partially positioned within the cavity.

10. The PTO arrangement of claim 1, further comprising a vehicle controller coupled to the transmission unit and the control unit of the PTO speed control system, the vehicle controller configured to provide the selected speed ratio to the control unit.

11. A power take-off (PTO) speed control system for a power take-off (PTO) arrangement that transfers power between an input shaft and an output shaft at a speed ratio selected from at least two speed ratios, the PTO speed control system comprising:
    a PTO shaft configured to be coupled to the output shaft and having a PTO flange with a diameter;
    a sensor arrangement positioned proximate to the PTO shaft and configured to evaluate the PTO flange and to generate a PTO flange output signal based on the PTO flange evaluation; and a control unit coupled to the sensor arrangement and configured to selectively disable operation of the PTO shaft based on the PTO flange output signal and the selected speed ratio wherein the sensor arrangement is spaced apart from the PTO flange and has a detection range of a predetermined distance; and wherein the sensor arrangement is configured to output a first PTO flange output signal when the PTO flange is spaced from the sensor arrangement less than the predetermined distance and a second PTO flange output signal when the PTO flange is spaced from the sensor arrangement greater than the predetermined distance.

12. The PTO speed control system of claim 11, wherein the PTO flange has a diameter that represents a designated speed for operation of the PTO shaft, and wherein the sensor arrangement is configured to evaluate the PTO flange based on the diameter.

13. The PTO speed control system of claim 11, wherein the at least two speed ratios include a first speed ratio and a second speed ratio, the first speed ratio being greater than the second speed ratio, and wherein the control unit is configured to disable the PTO arrangement when the selected speed ratio is the first speed ratio and the control unit receives the second PTO flange output signal from the sensor arrangement.

14. The PTO speed control system of claim 11, wherein the sensor arrangement comprises at least one of a Hall effect sensor and a proximity sensor.

15. The PTO speed control system of claim 11, wherein the transmission unit has a housing defining an axial housing flange circumscribing at least a portion of the output shaft and the PTO shaft, the sensor arrangement being mounted on the axial housing flange.

16. The PTO speed control system of claim 15, wherein the PTO flange defines a first set of mounting holes and output shaft defines a second set of mounting holes; and wherein the PTO speed control system further comprises:
fasteners extending through the first and second set of mounting holes for securing the PTO shaft to the output shaft.

17. The PTO speed control system of claim 16, further comprising:

a seal positioned between the output shaft and the axial housing flange; and a cavity formed by the seal, the output shaft, and the axial housing flange, wherein the sensor arrangement is at least partially positioned within the cavity.

18. A work vehicle, comprising:
a power system;
a propulsion system driven by the power system to move the work vehicle; and
a power take-off (PTO) arrangement driven by the power system and configured to provide power to an implement attached to the work vehicle at a speed ratio selected from at least two speed ratios, the PTO arrangement comprising
a housing;
an input shaft at least partially extending into the housing and configured to be driven by the work vehicle;
an output shaft at least partially extending into the housing; and
a PTO shaft coupled to the output shaft and configured to be rotationally coupled to the implement, the PTO shaft comprising a PTO flange; and
a PTO speed control system comprising:
a sensor arrangement mounted on the housing proximate to the PTO shaft and configured to sense data associated with the PTO flange and generate a PTO flange output signal based on the PTO flange data; and
a control unit coupled to the sensor arrangement and configured to selectively disable operation of the PTO arrangement based on the PTO flange output signal and the selected speed ratio;
wherein the sensor arrangement is spaced apart from the PTO flange and has a detection range of a predetermined distance; and
wherein the sensor arrangement is configured to output a first PTO flange output signal when the PTO flange is spaced from the sensor arrangement less than the predetermined distance and a second PTO flange output signal when the PTO flange is spaced from the sensor arrangement greater than the predetermined distance.

* * * * *